Aug. 31, 1948.  M. C. FORS  2,448,303
HOPPER GATE
Filed Jan. 12, 1944
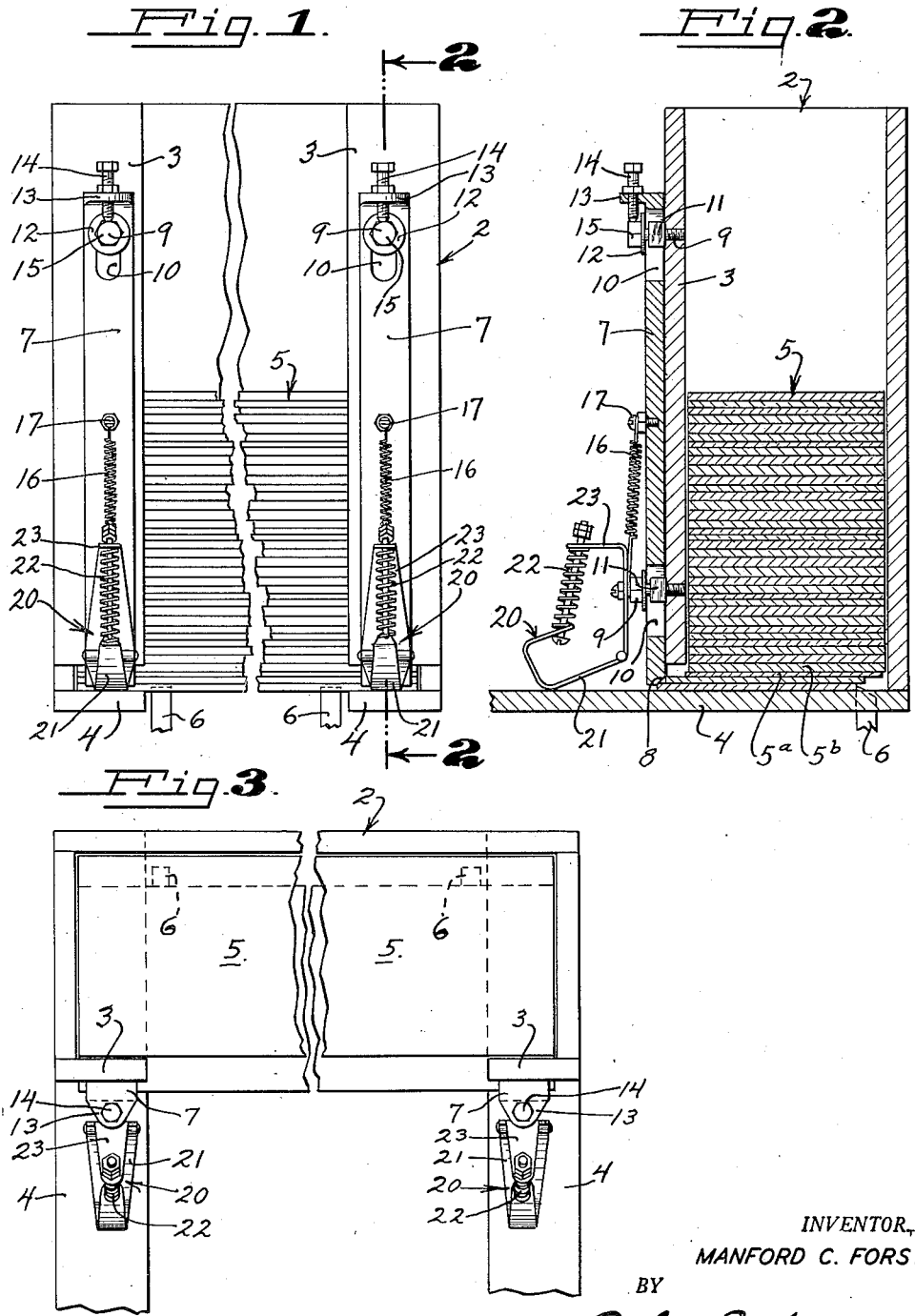
INVENTOR,
MANFORD C. FORS.
BY
Chas. E. Townsend
ATTORNEY.

Patented Aug. 31, 1948

2,448,303

UNITED STATES PATENT OFFICE 2,448,303

HOPPER GATE

Manford C. Fors, Salinas, Calif.

Application January 12, 1944, Serial No. 517,929

1 Claim. (Cl. 271—44)

This invention relates to hopper gates, and more particularly to an improved hopper gate for use with hoppers adapted to feed wood slats to automatic nailing machines such as are used in the manufacture of wood boxes and crates for shipping fresh vegetable produce and the like.

Heretofore the feeding of wood slats from hoppers has resulted in delay and inefficiency in the production of boxes or the like, caused by the tendency of the slats to stick together resulting in more than one slat being ejected at a time; also because slats are of varying thicknesses in a given hopper a plurality may be ejected simultaneously from the stationary hopper gate or become jammed in the gate, thereby preventing the discharge of further slats therethrough.

It is an object of the present invention to improve hopper gate construction so that only one slat may be discharged at a time and which prevents the jamming of the gate caused by irregularities in the thicknesses of the slats ejected.

The problems of handling slats which vary in thickness are manifest. For example, slats are sold in lots as ¼-inch slats but they may vary from $\tfrac{1}{16}$ of an inch to well over ⅝ of an inch. Further, the problem of feeding only one slat at a time from a hopper is increased by the tendency of slats to adhere together frictionally or because of exuded sap.

The present invention has been illustrated with a conventional hopper adapted to contain slats for use in making boxes. The means for feeding a slat from the hopper is illustrated by a pair of fingers or dogs which are ordinarily carried on a reciprocal carriage mounting a rotatable drum, with the dogs carried eccentrically thereon. The carriage mechanism forms no part of the invention. It is noted, however, that the dogs are adapted to engage a part of a slat and push it from the hopper to a proper position where it is nailed to the box assembly by an automatic nailing machine. The dogs feed the slats from the hopper at a very rapid rate and any jamming or feeding of two slats at a time instead of one causes serious loss of time in the manufacture of boxes or the like.

Other objects of the invention are to provide a hopper gate which is inexpensive to manufacture and assemble and which may be easily attached to a conventional hopper; to provide an automatic, reciprocal hopper gate which prevents more than one slat being fed therefrom at a time; to provide a hopper gate which is variable in adjustment and which is adjustable to handle varying thickness of slat stock; to provide a hopper gate with an attachment therefor to slow down the rate of ejection of the slats from the hopper and help to guide the slats to the point of proper position thereof in readiness for nailing or other operation. Other objects of the invention will become apparent upon referring to the following specification and drawings attached hereto and made a part hereof.

With reference to the drawings, in which similar characters of reference represent corresponding parts in the several views:

Fig. 1 is a front, vertical, elevational view of a hopper to which my gate is attached.

Fig. 2 is a vertical sectional view of the hopper and gate taken on line 2—2 of Fig. 1.

Fig. 3 is a top plan view of the invention attached to a hopper.

The invention comprises, essentially, a vertically reciprocal gate, which is self-adjustable to prevent the ejection of more than one slat at a time from a hopper, generally indicated at 2 and which comprises a rectangular compartment, the front panels 3 of which terminate short of the bottom guideways 4 to allow room for egress of the slats, generally indicated at 5. The hopper, as herein described, is shown as having an open front, but, needless to say, such need not be the case, nor, for that matter, would the hopper be of such small capacity as that herein illustrated. When the front wall is referred to as "3," it is understood as the equivalent of the front panels 3, as herein illustrated.

The dogs or fingers 6 are illustrated fragmentarily in order to show how the slats are engaged thereby and pushed from the hopper through the gate and along the bottom guideways 4 to a desired position.

Fixed at opposite sides to the front wall 3 of the hopper are two vertically reciprocally mounted gates 7, provided with beveled bottom ends 8, i. e. beveled in the direction of the interior of the hopper and which project below the bottom of the front wall 3 adjacent to the bottom guideways 4.

As herein illustrated, the gates 7 are slidably connected to the front wall 3 by means of bolts 9, inserted through slots 10 formed in the said gates and affixed to the said front wall. The bolts, preferably, are provided with strike nuts 11. Washers 12 or the like are provided and are adapted to extend over the edges of the slots 10. The top of each gate carries an outwardly projected flange 13 provided with a threaded bore, through which a bolt 14 is inserted, adapted to abut against the head 15 of each upper bolt 11.

The purpose of the bolt 14 is to limit adjustably the space between the bottom of the gates and the guideways 4.

It is seen from this construction that the gates 7 may slide vertically with respect to the front wall of the hopper so that when the slats 5 are forced outwardly against the beveled portion 8 of the bottom of the gates the resultant camming action between said gates and slat forces the gate to slide upwardly to allow egress of a slat regardless of its thickness.

It is sometimes judicious to provide a coil spring 16 affixed to each gate by means of a screw 17 or by other suitable means and connected to the bolt 9 in order to provide greater downward pressure that is the case when relying on the weight of the gates alone. The additional spring 16 is used preferably, for example, when the hopper is feeding very thin slot material.

I also prefer to attach guide means, generally indicated at 20, to the front portion of each gate which comprises a hinged tension member 21, spring biased downwardly by means of a coil spring 22 carried by a support member 23, to which member 21 is pivotally connected. The support member 23 is preferably attached to the lower bolt 9 by any suitable means. The guide means is generally for the purpose of exerting pressure downwardly against a slat ejected from the hopper to press the slat against the guideways 4 to slow down the speed of ejection of the slat. It also serves to guide the said slat properly toward its point of nailing position while it is being pushed thereto by means of the dogs or fingers 6.

It is noted that this time that the slats, generally indicated at 5, are of varying thickness as, for example, the thin slat illustrated at 5ª and the relatively thicker slat represented at 5ᵇ. The vertically adjustable gate is set by means of the limiting bolt 14 so that the bottom thereof is elevated above the guideway 4 in order to contact the smallest slat expected in a given stock pile, as, for example, slat 5ª. Hence when two slats stick together and the dog 6 moves the bottommost slat forwardly, the gates are elevated, by contact of the forward end of the slat against the beveled portion 8 of the said gate, thereby allowing the bottommost slat to pass under the said gate but no other slat. When two slats are stuck together only the bottom slat will be ejected, in view of the fact that it is fed out by engagement with mechanical feed dogs 6 and forces gates 7 vertically upwardly, whereas the slat directly above is carried along until the forward face thereof strikes a gate and it is literally "scraped" off the lowermost slat to remain in the hopper until the dogs 6 pick it up and force it through the gates. The adjustment of the gates and the downward pressure exerted by the gates must be sufficient to overcome normal frictional and gum adherence of slats. The weight of the gates and spring tension member 16 are designed to effect this result. The bottom slat may mass underneath the gate in view of the fact that it is being forced therethrough by the finger 6, but, as already mentioned, finger 6 does not contact any other slat and, therefore, the gate effectively restrains the forward movement of a slat stuck thereto by means of frictional or gum adherence.

While I have illustrated and described my invention in more or less detail for purposes of clarity of description and example, it is understood that modifications, variations and changes may be made in the structure only as limited by the spirit of the invention and the scope of the appended claim.

I claim:

In combination with a wood slat hopper having flat bottom members and arranged to contain a plurality of wood slats of varying thicknesses stacked therein and supported by said bottom members, said hopper comprising a front wall terminating short of said bottom members, a hopper gate comprising two gate members mounted on opposite sides of the front wall of said hopper and arranged for limited vertical sliding movement relative thereto and relative to one another, each of said gate members having an identically beveled bottom end, each said end spaced vertically from said bottom members a predetermined distance substantially equal to the thickness of the thinnest slat in said stack, said gate members each having an adjustable stop means to adjust the predetermined spacing of said bottom ends relative to said bottom members, a slat ejection mechanism to move the bottom slat of said stack of slats forwardly against the beveled ends of said gate members to move said gate members slidably upwardly to permit the ejection of said bottom slat from said hopper, spring means to bias the bottom ends of said gate members downwardly against the top of the bottom slat during the ejection of said bottom slat from said hopper to scrape from said bottom slat another slat adhering thereto, guides connected to said front wall, each said guide comprising a pivotally mounted compression member, and adjustable spring means to urge said compression members downwardly in order to retard the movement of said bottom slat after its ejection from said hopper.

MANFORD C. FORS.

REFERENCES CITED

The following references are of record in the file of this patent:

UNITED STATES PATENTS

| Number | Name | Date |
|---|---|---|
| 699,686 | Johnston | May 13, 1902 |
| 972,555 | Mann | Oct. 11, 1910 |
| 1,149,752 | Grissinger | Aug. 10, 1915 |
| 1,207,161 | Goldsmith | Dec. 5, 1916 |
| 1,584,807 | Roberts | May 18, 1926 |
| 1,643,646 | Swift | Sept. 27, 1927 |